(12) United States Patent
Padaki et al.

(10) Patent No.: US 11,357,042 B2
(45) Date of Patent: Jun. 7, 2022

(54) APPARATUS AND METHOD FOR FLEXIBLE OPERATIONAL STRUCTURES FOR UWB DEVICES

(71) Applicant: Samsung Electronics Co., Ltd., Suwon-si (KR)

(72) Inventors: Aditya V. Padaki, Richardson, TX (US); Zheda Li, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 16/677,473

(22) Filed: Nov. 7, 2019

(65) Prior Publication Data

US 2020/0154473 A1    May 14, 2020

Related U.S. Application Data

(60) Provisional application No. 62/760,102, filed on Nov. 13, 2018, provisional application No. 62/778,155, (Continued)

(51) Int. Cl.
*H04W 74/02* (2009.01)
*H04L 1/00* (2006.01)
(Continued)

(52) U.S. Cl.
CPC ........... *H04W 74/02* (2013.01); *H04L 1/0071* (2013.01); *H04W 40/244* (2013.01); *H04W 72/0446* (2013.01)

(58) Field of Classification Search
CPC ............ H04W 72/02; H04W 72/0446; H04W 40/244; H04W 4/80; H04W 4/029; H04W 12/06; H04L 1/0071
See application file for complete search history.

(56) References Cited

U.S. PATENT DOCUMENTS 9,025,585 B2 *  5/2015  Hong ............... H04W 72/0446
370/347
2009/0257410 A1  10/2009  Liu
(Continued)

FOREIGN PATENT DOCUMENTS

EP           2426865 A2      3/2012
KR    10-2006-0061016 A     6/2006

OTHER PUBLICATIONS

Notification of Transmittal of the International Search Report and the Written Opinion of the International Searching Authority, or the Declaration dated Feb. 19, 2020 in connection with International Patent Application No. PCT/KR2019/015447, 11 pages.
(Continued)

*Primary Examiner* — Jamal Javaid

(57) ABSTRACT

A method of transmit apparatus in a wireless communication system supporting ranging capability is provided. The method comprises determining a beacon interval including a ranging management period and a ranging period, wherein the beacon interval is a variable interval, generating a beacon signal including information for a number of channel access slots corresponding to a ranging contention access period (RCAP) and a ranging contention free period (RCFP), transmitting, to a receive apparatus, the beacon signal at the determined beacon interval, and transmitting, to the receive apparatus, at least one channel access slot in the ranging management period.

20 Claims, 17 Drawing Sheets

Related U.S. Application Data filed on Dec. 11, 2018, provisional application No. 62/865,374, filed on Jun. 24, 2019, provisional application No. 62/880,152, filed on Jul. 30, 2019, provisional application No. 62/916,336, filed on Oct. 17, 2019.

(51) Int. Cl.
*H04W 72/04* (2009.01)
*H04W 40/24* (2009.01)

(56) References Cited

U.S. PATENT DOCUMENTS

| | | |
|---|---|---|
| 2012/0320881 A1 | 12/2012 | Hong et al. |
| 2014/0133473 A1* | 5/2014 | Shin .................. H04W 72/0446 370/336 |
| 2015/0131570 A1 | 5/2015 | Kwon et al. |
| 2015/0230170 A1 | 8/2015 | Jeong et al. |

OTHER PUBLICATIONS

"Smart Body Area Network (SmartBAN); Low Complexity Medium Access Control (MAC) for SmartBAN", ETSI TS 103 325 V1.1.1, Apr. 28, 2015, See sections 5.2.2.0, 6.2.2.0; and figure 12, 36 pages.

"IEEE Standard for Low-Rate Wireless Networks", IEEE Standards Association, IEEE Std 802.15.4TM-2015, Dec. 2015, 708 pages.

"IEEE Standard for Information technology—Telecommunications and information exchange between systems—Local and metropolitan area networks—Specific requirements; Part 15.4: Wireless Medium Access Control (MAC) and Physical Layer (PHY) Specifications for Low-Rate Wireless Personal Area Networks (WPANs); Amendment 1: Add Alternate PHYs", IEEE Computer Society, IEEE Std 802.15.4aTM-2007, Aug. 2007, 203 pages.

"IEEE Standard for Wireless Medium Access Control (MAC) and Physical Layer (PHY) Specifications for Peer Aware Communications (PAC)", IEEE Standards Association, IEEE Std 802.15.8TM-2017, Dec. 2017, 322 pages.

"P802.15.4z™/D03 1 Draft Standard for Low-Rate Wireless 2 Networks 3; Amendment: Enhanced Ultra Wide-4 Band (UWB) Physical Layers (PHYs) 5 and Associated Ranging Techniques", LAN/MAN Standards Committee of the IEEE Computer, Oct. 2019, 180 pages.

European Patent Office, "Supplementary European Search Report" dated Oct. 29, 2021, in connection with European Patent Application No. 19883714.8, 9 pages.

\* cited by examiner

FIG. 20

| Bits: 3 | 1 | 4 | Octets: 2 | 2/4 | 2 | 1 | Variable |
|---|---|---|---|---|---|---|---|
| Version | Beacon Interval Length | Reserved | RBS Duration | Beacon Interval | First RCM Slot | RM Table length | RM Table |

| Bits: 11 | 11 | 1 | 1 |
|---|---|---|---|
| Starting RBS Number | Ending RBS Number | RCAP/ RCFP Indicator | Reserved |

2100

APPARATUS AND METHOD FOR FLEXIBLE OPERATIONAL STRUCTURES FOR UWB DEVICES

CROSS-REFERENCE TO RELATED APPLICATIONS AND CLAIM OF PRIORITY

The present application claims priority to:
U.S. Provisional Patent Application Ser. No. 62/760,102 filed on Nov. 13, 2018;
U.S. Provisional Patent Application Ser. No. 62/778,155 filed on Dec. 11, 2018;
U.S. Provisional Patent Application Ser. No. 62/865,374 filed on Jun. 24, 2019;
U.S. Provisional Patent Application Ser. No. 62/880,152 filed on Jul. 30, 2019; and
U.S. Provisional Patent Application Ser. No. 62/916,336 filed on Oct. 17, 2019. The content of the above-identified patent documents is incorporated herein by reference.

TECHNICAL FIELD

The present disclosure relates generally to frameworks for flexible operational structures for UWB devices.

BACKGROUND

A peer aware communication (PAC) network is a fully distributed communication network that allows direct communication among the PAC devices (PDs). A PAC device is an electronic device that has communication capability. Additionally, the PAC device can also have ranging capability. The PAC device may be referred to as a ranging device (RDEV), or an enhanced ranging device (ERDEV), or a secure ranging device (SRDEV) or any other similar name. RDEV, ERDEV, or SRDEV can be a part of an access point (AP), a station (STA), an eNB, a gNB, a UE, or any other communication node with ranging capability as defined in IEEE standard specification. PAC networks may employ several topologies like mesh, star, etc. to support interactions among the PDs for various services.

SUMMARY

Embodiments of the present disclosure provide methods and apparatuses to enable flexible operational structures for UWB devices.

In one embodiment, a transmit apparatus in a wireless communication system supporting ranging capability is provided. The transmit apparatus comprises a processor configured to determine a beacon interval including a ranging management period and a ranging period, wherein the beacon interval is a variable interval and generate a beacon signal including information for a number of channel access slots corresponding to a ranging contention access period (RCAP) and a ranging contention free period (RCFP). The transmit apparatus further comprises a transceiver operably connected to the processor, the transceiver configured to transmit, to a receive apparatus, the beacon signal at the determined beacon interval and transmit, to the receive apparatus, at least one channel access slot in the ranging management period.

In another embodiment, a receive apparatus in a wireless communication system supporting ranging capability is provided. The receive apparatus comprises a transceiver configured to receive, from a transmit apparatus, a beacon signal at a determined beacon interval and receive, from the transmit apparatus, at least one channel access slot in a ranging management period. The receive apparatus further comprises a processor operably connected to the transceiver, the processor configured to determine the beacon interval including the ranging management period and a ranging period, the beacon interval being a variable interval, wherein the beacon signal includes information for a number of channel access slots corresponding to a ranging contention access period (RCAP) and a ranging contention free period (RCFP).

In yet another embodiment, a method of transmit apparatus in a wireless communication system supporting ranging capability is provided. The method comprises determining a beacon interval including a ranging management period and a ranging period, wherein the beacon interval is a variable interval, generating a beacon signal including information for a number of channel access slots corresponding to a ranging contention access period (RCAP) and a ranging contention free period (RCFP), transmitting, to a receive apparatus, the beacon signal at the determined beacon interval, and transmitting, to the receive apparatus, at least one channel access slot in the ranging management period.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The term "ranging," as well as derivatives thereof, mean that the fundamental measurements for ranging between devices are achieved by a transmission and a reception of one or more messages. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 20 illustrates an example format of the content field of ranging descriptor IE according to embodiments of the present disclosure;

FIG. 21 illustrates an example RM table of the RD IE according to embodiments of the present disclosure.

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; IEEE Standard Wireless Medium Access Control (MAC) and Physical Layer (PHY) Specifications for Low Rate Wireless Personal Area Networks (WPANs), Amendment 1: Add Alternative PHYs, IEEE Std 802.15.4a (2007); IEEE Draft Standard for Low-Rate Wireless Networks Amendment: Enhanced High Rate Pulse (HRP) and Low Rate Pulse (LRP) Ultra Wide-Band (UWB) Physical Layers (PHYs) and Associated Ranging Techniques, IEEE P802.15.4z/D03; and IEEE Standard for Low-Rate Wireless Networks, IEEE 802.15.4-2015.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
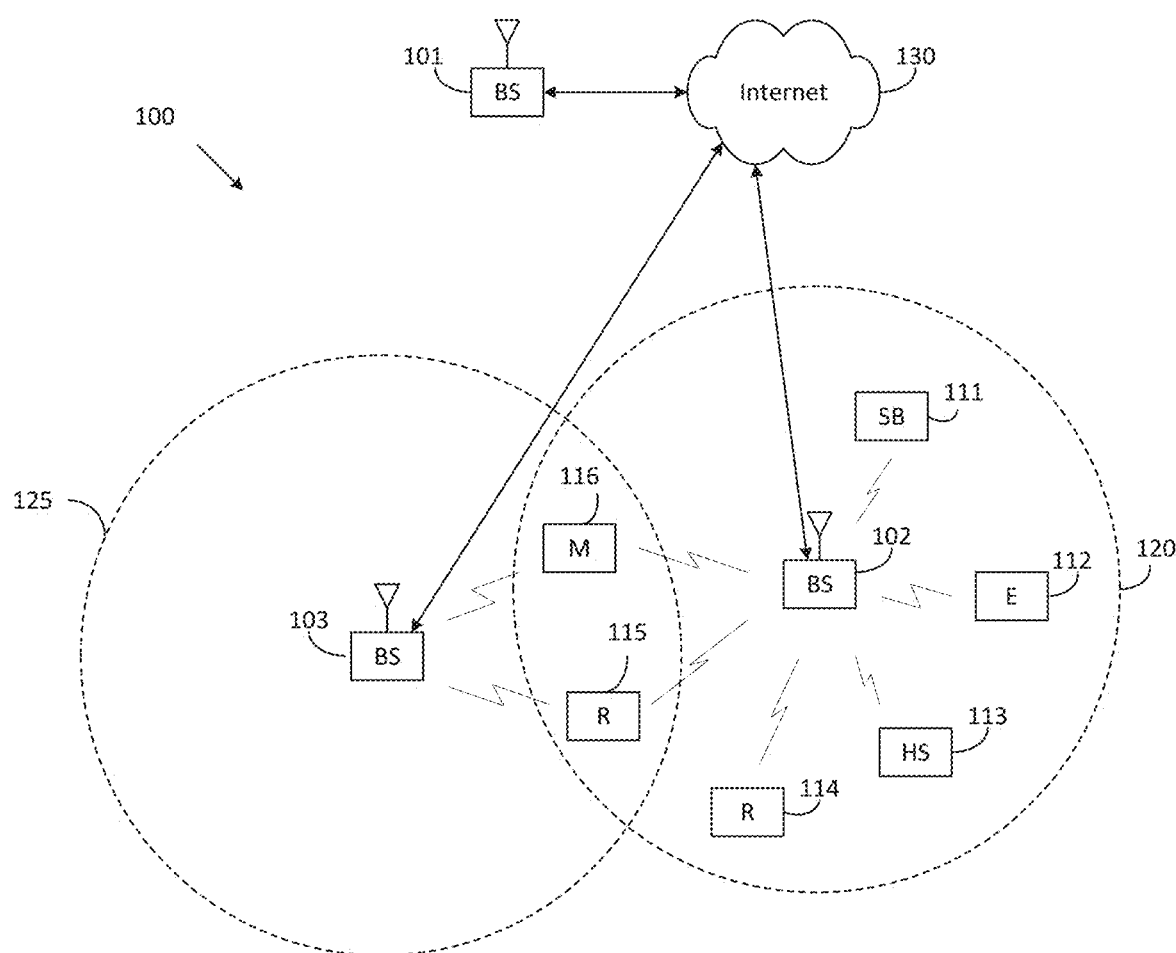
FIG. 1 illustrates an example wireless network according to embodiments of the present disclosure.
Figure 2:
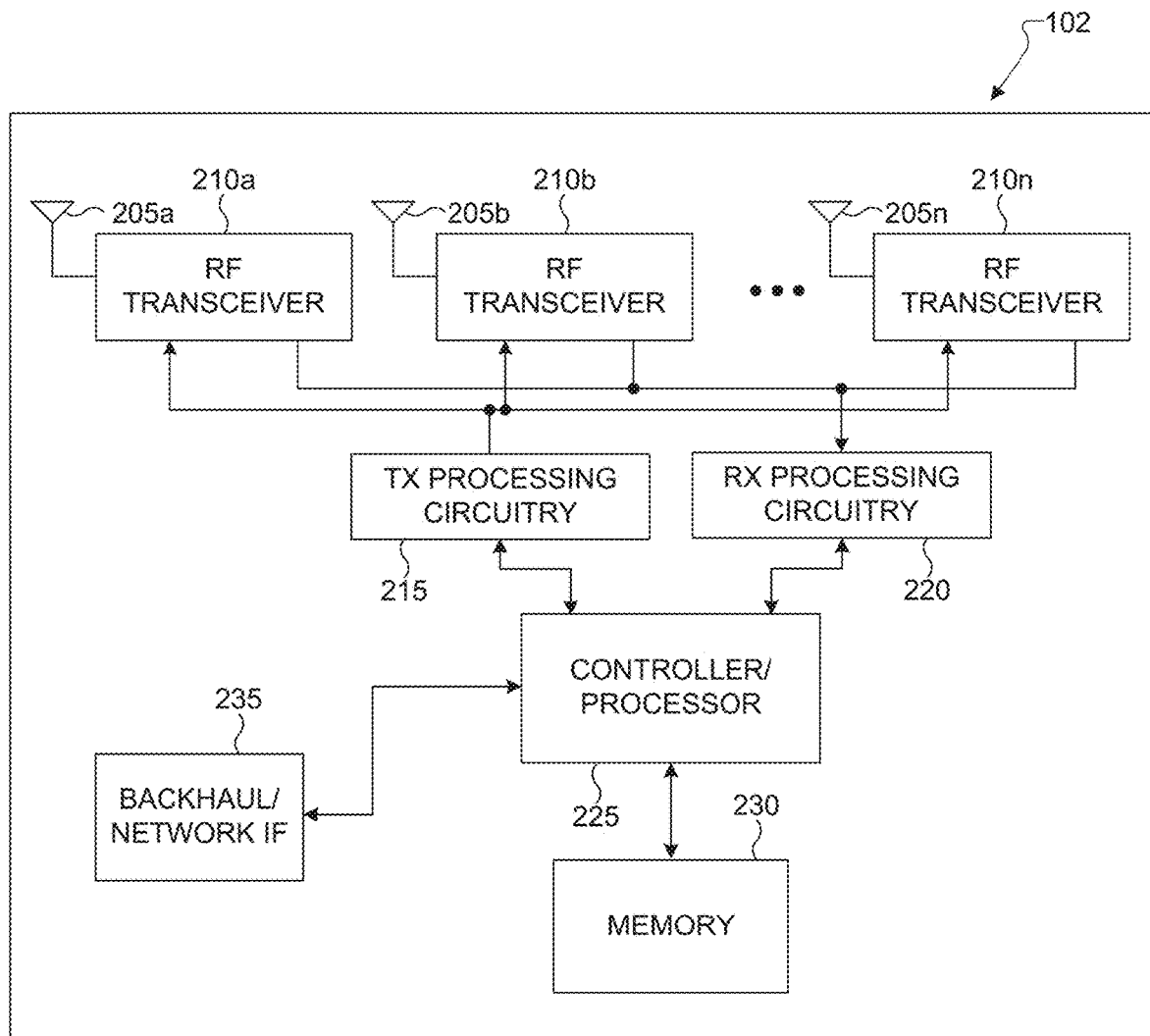
FIG. 2 illustrates an example gNB according to embodiments of the present disclosure.
Figure 3:
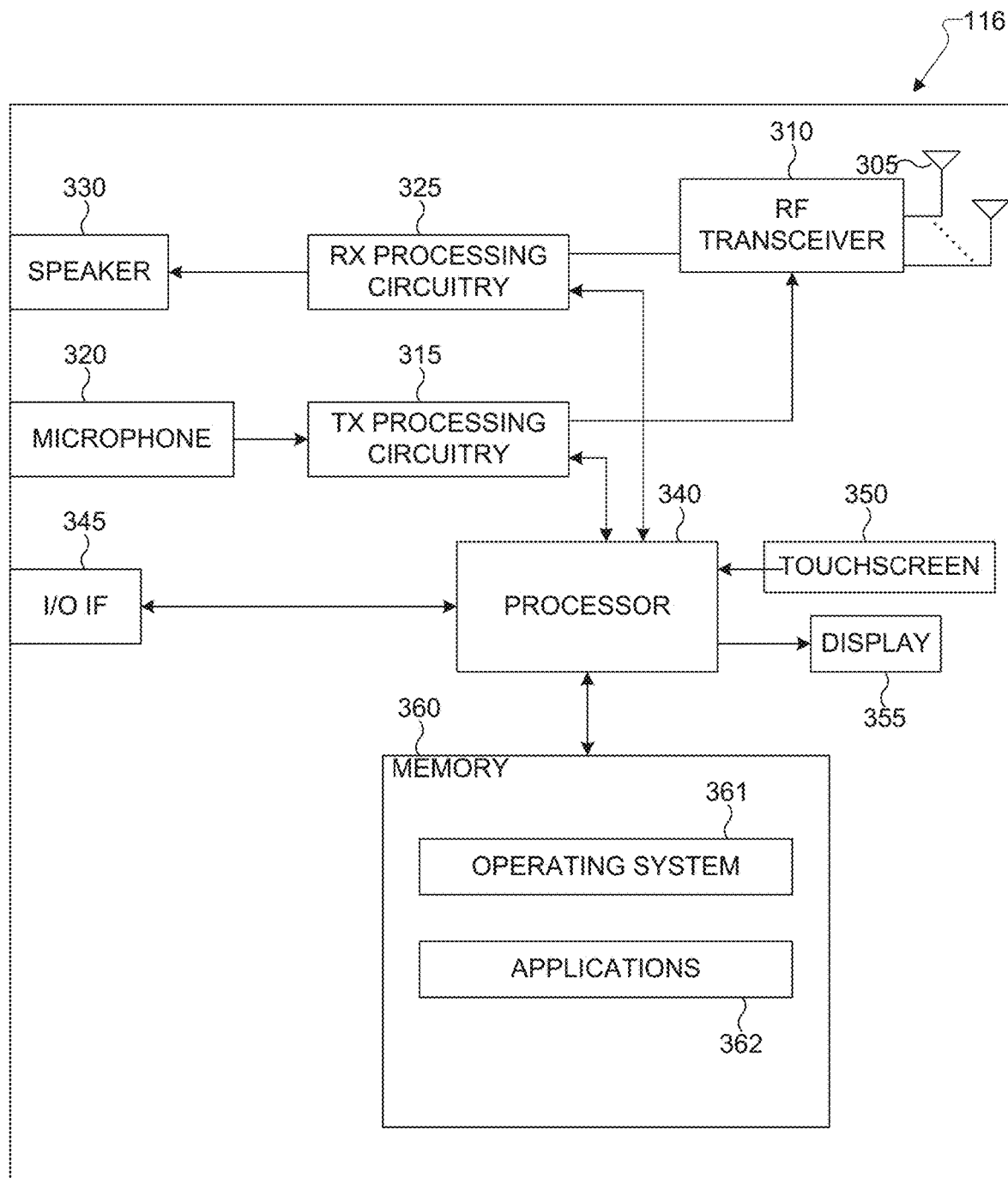
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for CSI reporting in an advanced wireless communication system. In certain embodiments, and one or more of the gNBs 101-103 includes circuitry, programming, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
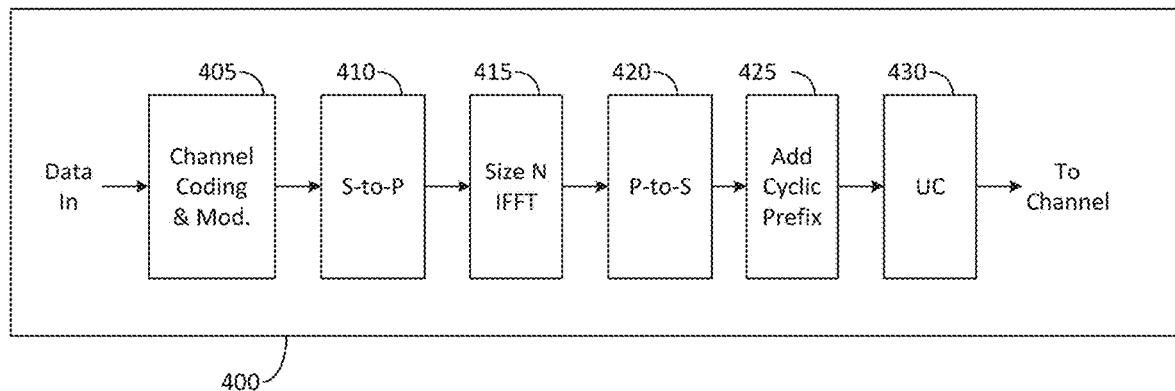
FIG. 4A illustrates a high-level diagram of an orthogonal frequency division multiple access transmit path according to embodiments of the present disclosure.
Figure 4B:
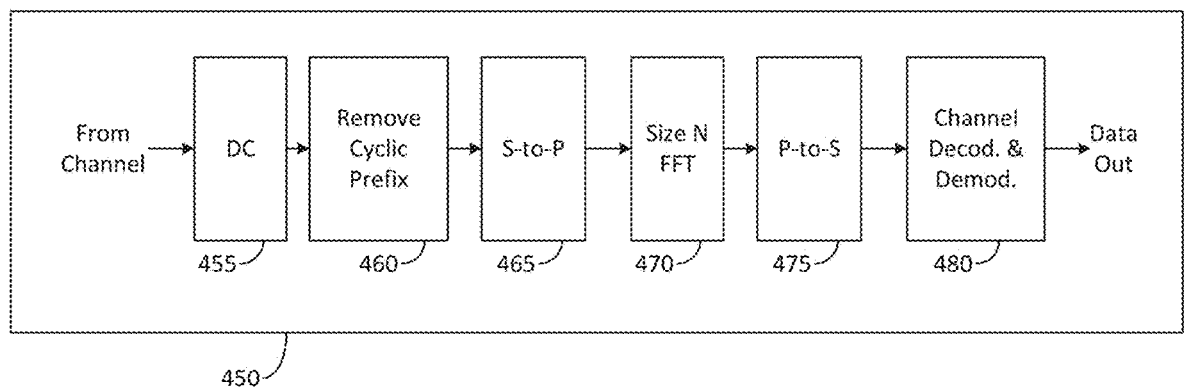
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). A wireless personal area network (WPAN) or simply a personal area network (PAN) may be a fully distributed communication network. A WPAN or PAN is communication network that allows wireless connectivity among the PAN devices (PDs). PAN devices and PAC devices may be interchangeably used as PAC network is also a PAN network and vice versa.

PAC networks may employ several topologies like mesh, star, and/or peer-to-peer, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
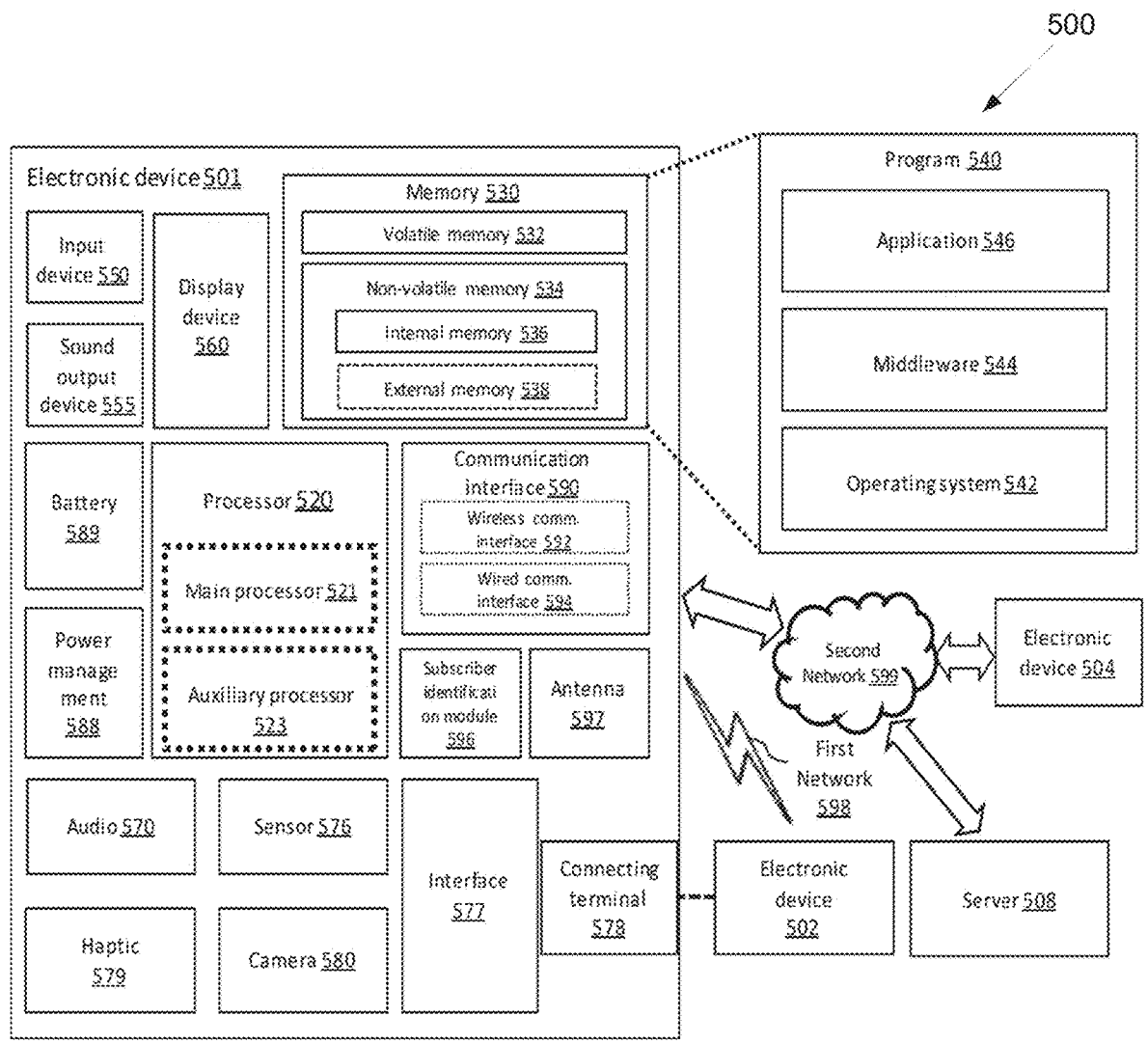
FIG. 5 illustrates an example electronic device according to embodiments of the present disclosure.

FIG. 5 illustrates an example electronic device 500 according to embodiments of the present disclosure. The embodiment of the electronic device 500 illustrated in FIG. 5 is for illustration only. FIG. 5 does not limit the scope of the present disclosure to any particular implementation.

PDs can be an electronic device that may have communication and ranging capability. The electronics device may be referred to as a ranging device (RDEV), or an enhanced ranging device (ERDEV), or a secure ranging device (SRDEV) or any other similar name in accordance with the IEEE standard specification. RDEV, ERDEV, or SRDEV can be a part of an access point (AP), a station (STA), an eNB, a gNB, a UE, or any other communication node with ranging capability.

FIG. 5 illustrates an example electronic device 501 in a network environment 500 according to various embodiments. Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520, and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by other component (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication. According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)). These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The operation of the PAC network can be based on a "superframe" structure that repeats continuously in back-to-back time periods. An example superframe structure is shown in FIG. 6.

Figure 6:
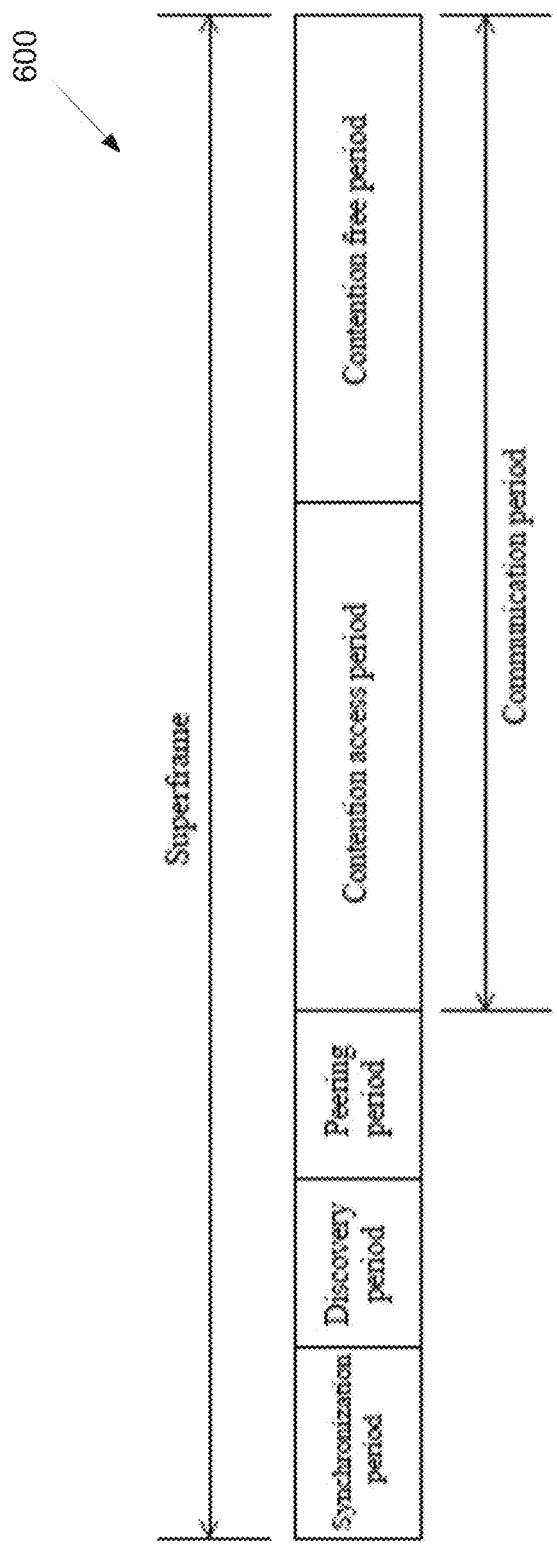
FIG. 6 illustrates an example superframe structure according to embodiments of the present disclosure.

FIG. 6 illustrates an example superframe structure 600 according to embodiments of the present disclosure. The embodiment of the superframe structure 600 illustrated in FIG. 6 is for illustration only. FIG. 6 does not limit the scope of the present disclosure to any particular implementation.

A superframe can comprises a synchronization period, a contention access period, and a contention free period, and additionally may comprise a discovery period and a peering period. While the duration of the contention access period and contention free period can be changed, the duration of the superframe structure is set to a constant within the IEEE 802.15 specification standards. The description of a fixed frame structure and duration can inhibit flexible operations of future UWB networks. However, several applications, use cases and scenarios require flexible frame structures. The present disclosure provides the framework and mechanisms for flexible duration of the frame (or superframe) structures that can be employed in UWB networks, such as those based on the 802.15.4z standard.

The superframe duration is currently specified by the PAC network information base (PIB) aSuperframeDuration. In the present disclosure, the framework is provided to enable variable aSuperframeDuration. It is to be noted that while we have used superframe as an example case to further our developments, the concept applies to any variable "frame" duration for network MAC layer operations.

A superframe can have one or more frames. Terminology other than "superframe" is possible, such as "ranging interval," "super interval," "super period," "ranging period." In one example of nomenclature, "frame" can replace "superframe;" and "slot" or other terms can replace "frame." Other nomenclatures are possible. The superframe duration can be changed according to the scenario, use case, application, etc., by the next higher layer, vendor specification, etc. as shown in FIG. 7.

Figure 7:
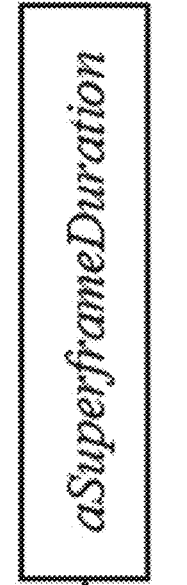
FIG. 7 illustrates an example variable PIB superframe duration according to embodiments of the present disclosure.

FIG. 7 illustrates an example variable PIB superframe duration 700 according to embodiments of the present disclosure. The embodiment of the variable PIB superframe duration 700 illustrated in FIG. 7 is for illustration only. FIG. 7 does not limit the scope of the present disclosure to any particular implementation.

As illustrated in FIG. 7, the specification of the variable PIB aSuperframeDuration by next higher layer, or vendor specification, etc., is provided.

The frame formats of the UWB standard such as IEEE 802.15.4z can be defined to incorporate flexibility in operation of the frame format.

An initial frame can have a provision to specify the duration of the superframe. This initial frame can be for example, a synchronization frame. The duration can be incorporated as an information element or as part of an information element in the frame. In the context of the superframe, the synchronization period can be used for this purpose. The SYNC frame for UWB PHY in 802.15.8 is as shown in FIG. 8.

Figure 8:
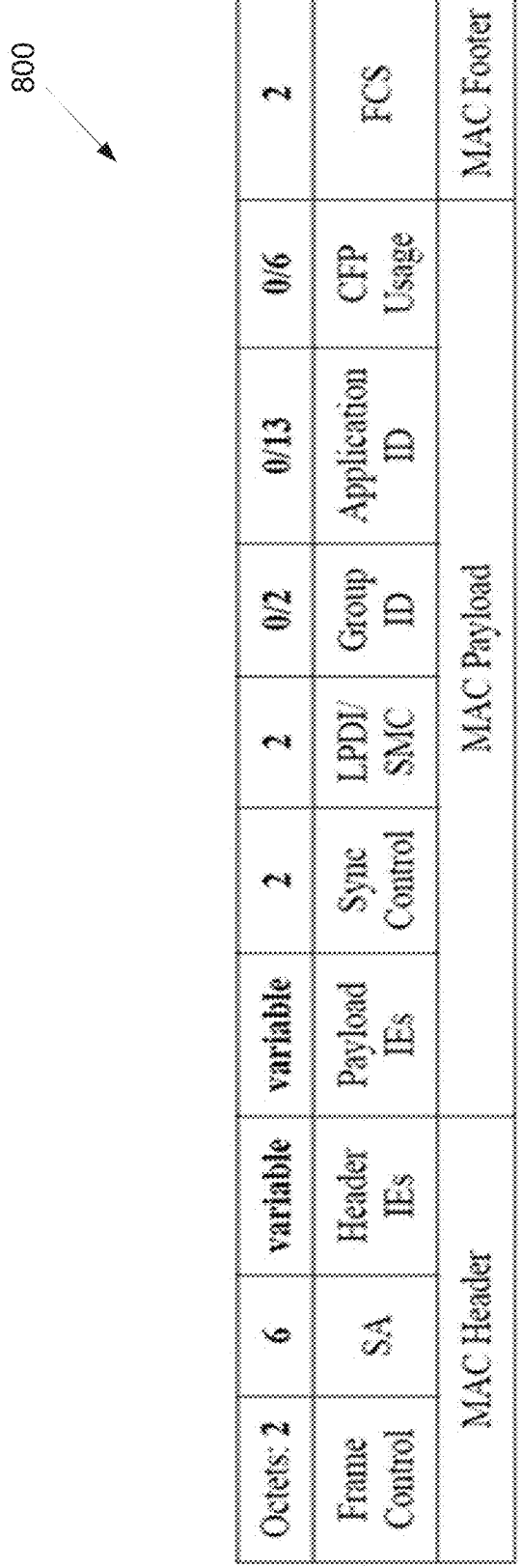
FIG. 8 illustrates an example SYNC frame for UWB PHY according to embodiments of the present disclosure.

FIG. 8 illustrates an example SYNC frame 800 for UWB PHY according to embodiments of the present disclosure. The embodiment of the SYNC frame 800 illustrated in FIG. 8 is for illustration only. FIG. 8 does not limit the scope of the present disclosure to any particular implementation.

There can be other examples of the initial frame such as a frame that initiates or triggers a ranging procedure between at least one pair of PDs. Such an initial frame can be called "ranging initiation" frame.

A header IE can be defined to specify the duration of superframe (aSuperframeDuration) for this purpose. A Class 0 header IE for example can be used for this purpose as shown below.

Figure 9:
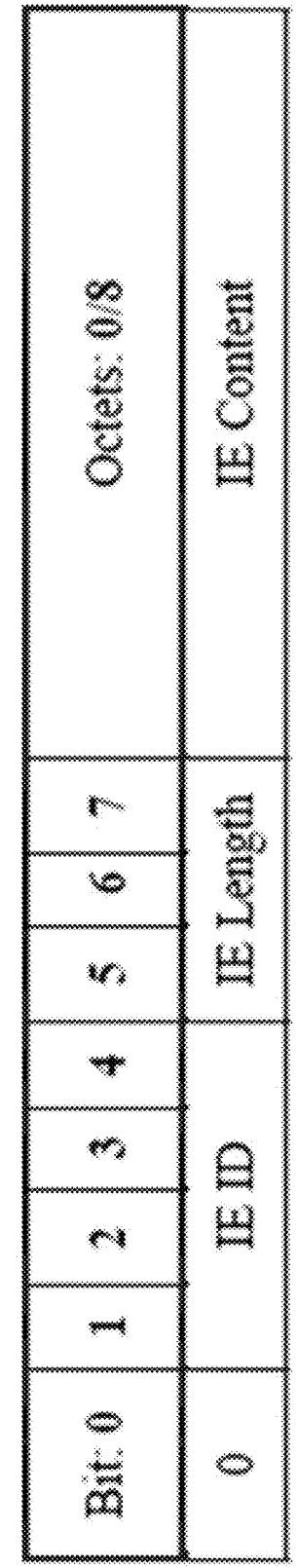
FIG. 9 illustrates an example IE Class 0 according to embodiments of the present disclosure.

FIG. 9 illustrates an example IE Class 0 900 according to embodiments of the present disclosure. The embodiment of the IE Class 0 900 illustrated in FIG. 9 is for illustration only. FIG. 9 does not limit the scope of the present disclosure to any particular implementation.

As illustrated in FIG. 9, IE ID is determined with an exclusive number chosen from 2 to 15 reserved IDs (for example, 2), IE Length is determined with 1 octet to 8 octets, and IE content is determined with a duration of the superframe e.g. in ms (aSuperframeDuration)

Figure 10:
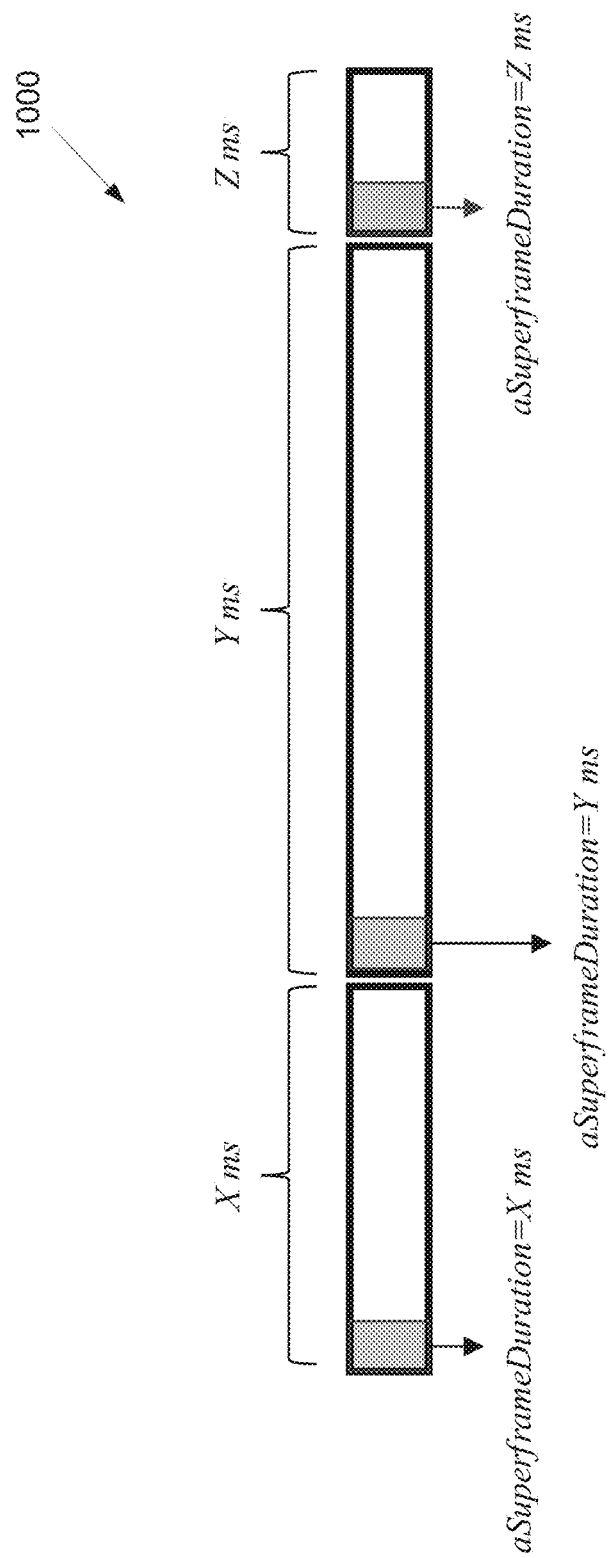
FIG. 10 illustrates an example variable superframe durations according to embodiments of the present disclosure.

Illustrative examples of superframes (that may be consecutive) with different duration that are transmitted are shown in FIG. 10.

FIG. 10 illustrates an example variable superframe durations 1000 according to embodiments of the present disclosure. The embodiment of the variable superframe durations 1000 illustrated in FIG. 10 is for illustration only. FIG. 10 does not limit the scope of the present disclosure to any particular implementation.

As illustrated in FIG. 10, variable superframe durations specified by aSuperframeDuration and/or relevant IEs are provided.

The IEEE 802.15.8 synchronization period has 8 slots, and the SYNC frame occupied 1 of those 8 slots. The standard has provision to specify which slot the SYNC occupies. However, with the variable superframe length, the number of slots in the synchronization duration can also be variable. This can be specified, for example, using Class 0 Header IE with the following specifications: IE ID: An exclusive number chosen from 2 to 15 reserved IDs (for example 3) (Note: 2 to 15 is an example based on 802.15.8, it can be any range of numbers depending on the particular standard, scheme of framework), IE length: 1 octet to 8 octets, and IE content: Number of slots in the synchronization period (1 to N, where N is the maximum number of slots—for example, N=8).

The frame or superframe with a particular duration may or may not have back-to-back operations (or transmissions). An example is shown in FIG. 10.

Figure 11:
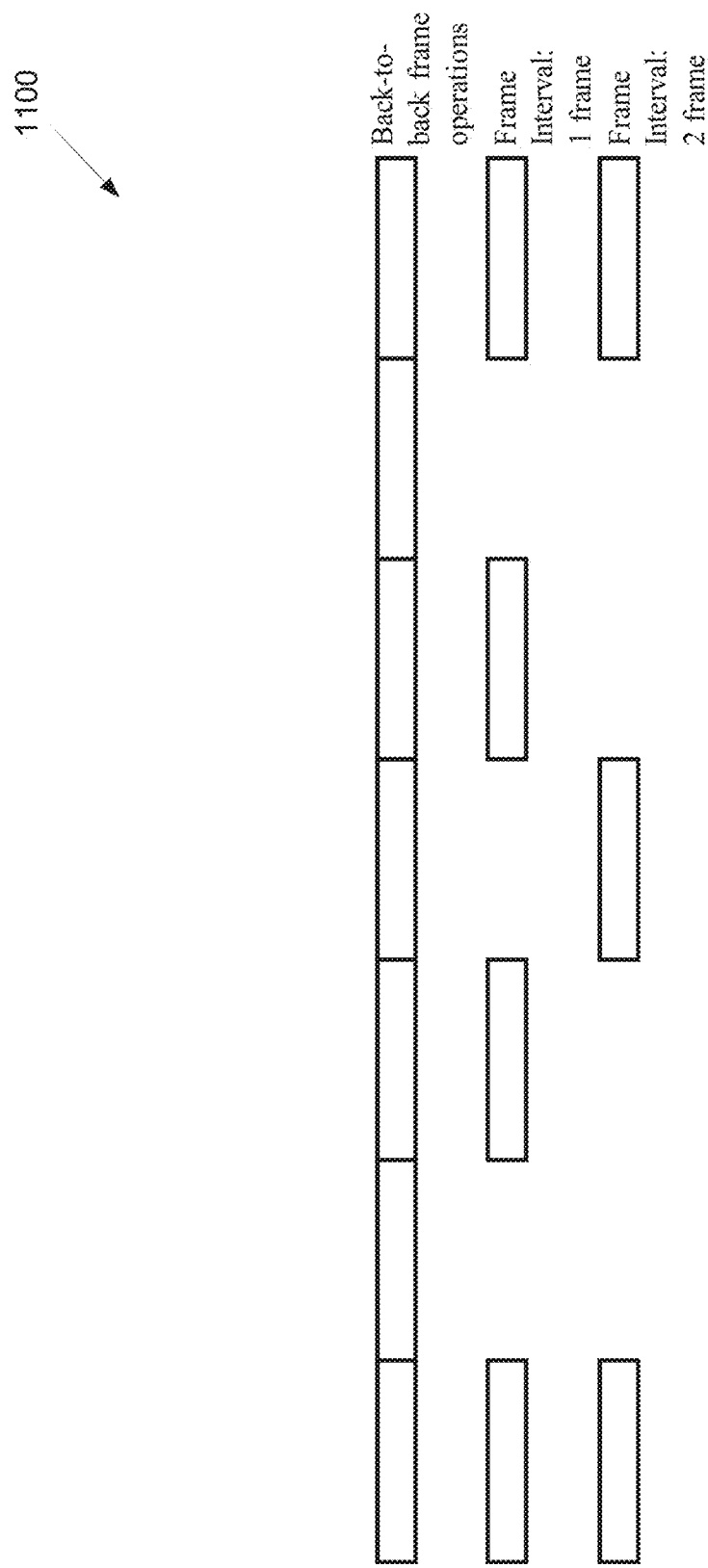
FIG. 11 illustrates an example different superframe repetition intervals according to embodiments of the present disclosure.

FIG. 11 illustrates an example different superframe repetition intervals 1100 according to embodiments of the present disclosure. The embodiment of the different superframe repetition intervals 1100 illustrated in FIG. 11 is for illustration only. FIG. 11 does not limit the scope of the present disclosure to any particular implementation.

The superframe repetition interval can be specified, for example, in a Class 0 header IE as follows: IE ID: An exclusive number chosen from 2 to 15 reserved IDs (for example 4) (Note: 2 to 15 is an example based on 802.15.8, it can be any range of numbers depending on the particular standard, scheme of framework), IE Length: 1 octet to 8 octets, and IE content: frame repetition interval, M.

Alternatively, a new field could be created in the initial frame format such as the SYNC frame to specify this information.

The repetition of the superframe may not be periodic, in which case the next superframe occurrence (or transmission) is specified in the IE content by specifying the Frame repetition interval, M in every transmitted superframe.

A change in the superframe length may require changes in other fields. For example, in the context of 802.15.8, the contention free period (CFP) usage is specified in SYNC frame, and whether or not CFP is present is specified in SYNC control. Note that CFP usage has 0 or 6 octets reserved because the length of the CFP when CFP is present, is fixed to a maximum of 48 slots. However, this can also be a variable with changing superframe duration. Thus, a payload IE can be defined to note the number of slots in the CFP, and the length of the CFP usage field.

In such example, IE ID: An exclusive number chosen from 9 to 15 reserved IDs (for example 9) (Note: 9 to 15 is an example based on 802.15.8, it can be any range of numbers depending on the particular standard, scheme of framework); IE length: 1 octet to 8 octets; and IE content: number of CFP slots (also the number of bits in the CFP usage field).

This is just one example. Similarly, an IE can be defined to specify the duration of contention access period. There may be multiple such parameters depending on the larger framework of the frame format and the operational schemes. These can be specified using the payload IEs or similar fields in the initial frame of the UWB flexible operational structure.

The SYNC frame can instead be replaced by a beacon or any other form periodic or aperiodic signaling scheme based on the particular framework or standard of operation. The periodic or aperiodic signaling scheme will them contain all the information enlisted in schemes S1 to S4 either as a field in the signaling scheme or as IEs. Another example framework of the signaling types that may be used for UWB ranging, for instance, is described below.

The operation of the secure ranging may be based on a ranging block (RB) that repeats continuously in back-to-back time periods. The RB may comprises one or more ranging rounds (RR), and each RR may consist of multiple slots. Analogous to the variable superframe duration, the duration of ranging round may be variable (i.e., number of slots per frame is flexible) and a frame such as the ranging control frame (RCF) in the ranging round itself or a next higher layer may convey this information.

The RR may or may not perform any particular function (such as ranging) in a given round. If a given round performs something, it is termed as an active round, else is termed inactive round (or any such nomenclature). An active round may consist of a control frame, such as the RCF. RCF comprises control information including but not limited to the time of next ranging round (or the number of inactive rounds before the next ranging round), slot duration, number of slots per ranging round, duration of the ranging round, etc. An illustration of this is shown in FIG. 12.

Figure 12:
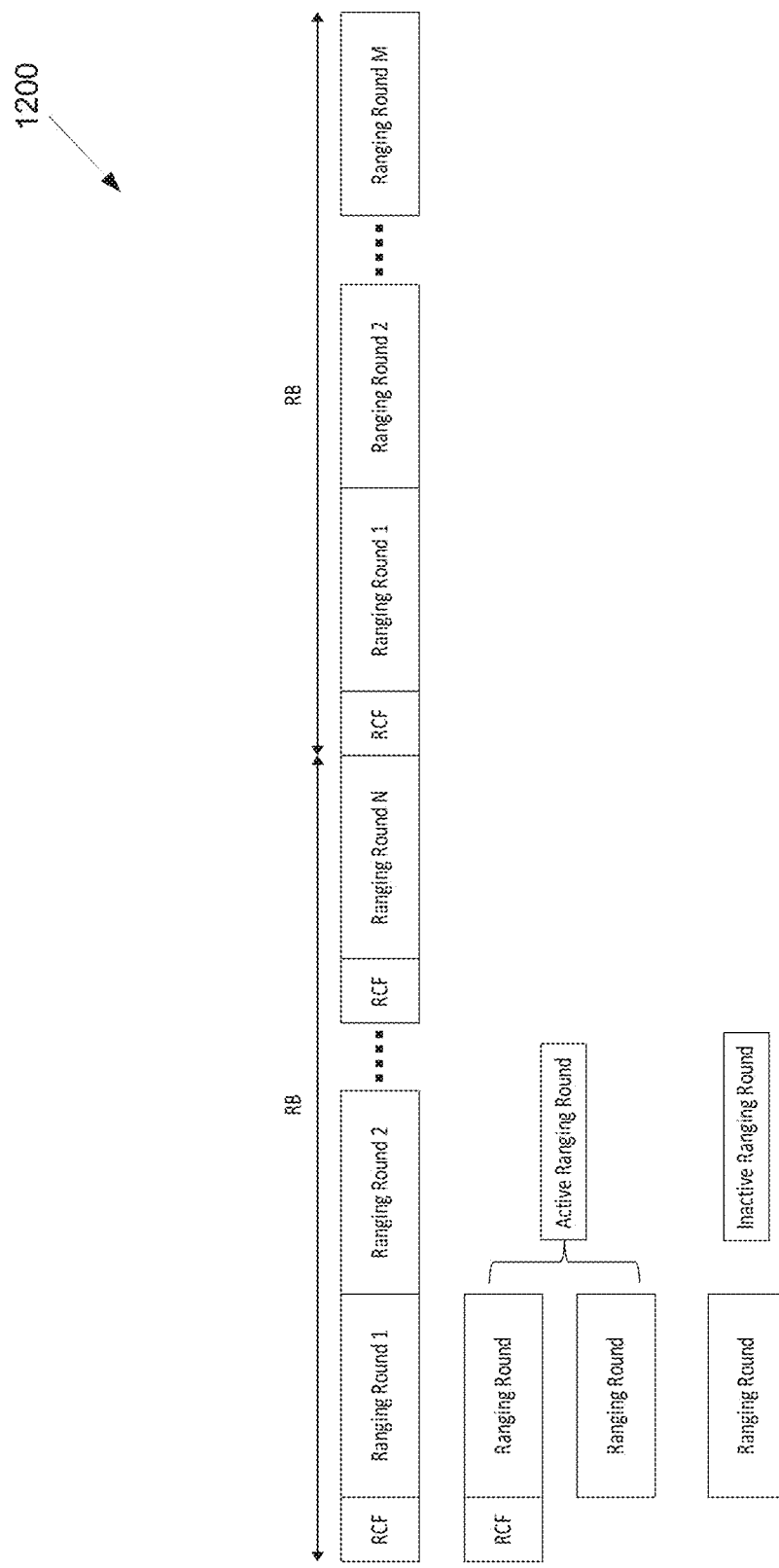
FIG. 12 illustrates an example ranging rounds according to embodiments of the present disclosure.

FIG. 12 illustrates an example ranging rounds 1200 according to embodiments of the present disclosure. The embodiment of the ranging rounds 1200 illustrated in FIG. 12 is for illustration only. FIG. 12 does not limit the scope of the present disclosure to any particular implementation.

A ranging round (RR) refers to the completion of the entire ranging event between the initiator(s) and the responder(s) of the UWB network. It consists of one or more polling periods (PP) and one or more ranging response periods (RRP). PP is the period used by the initiator(s) to communicate to the responder(s). RRP is the period used by responder(s) to communicate to the initiator(s). Each RR may consist of many type of ranging procedures. Illustrative timing diagram for three example cases of RR with RCF included in every ranging round is shown in FIG. 13—SS-TWR: single sided two way ranging, DS-TWR: double sided two way ranging, M2M DS-TWR: many-to-many double sided two way ranging.

Figure 13A:
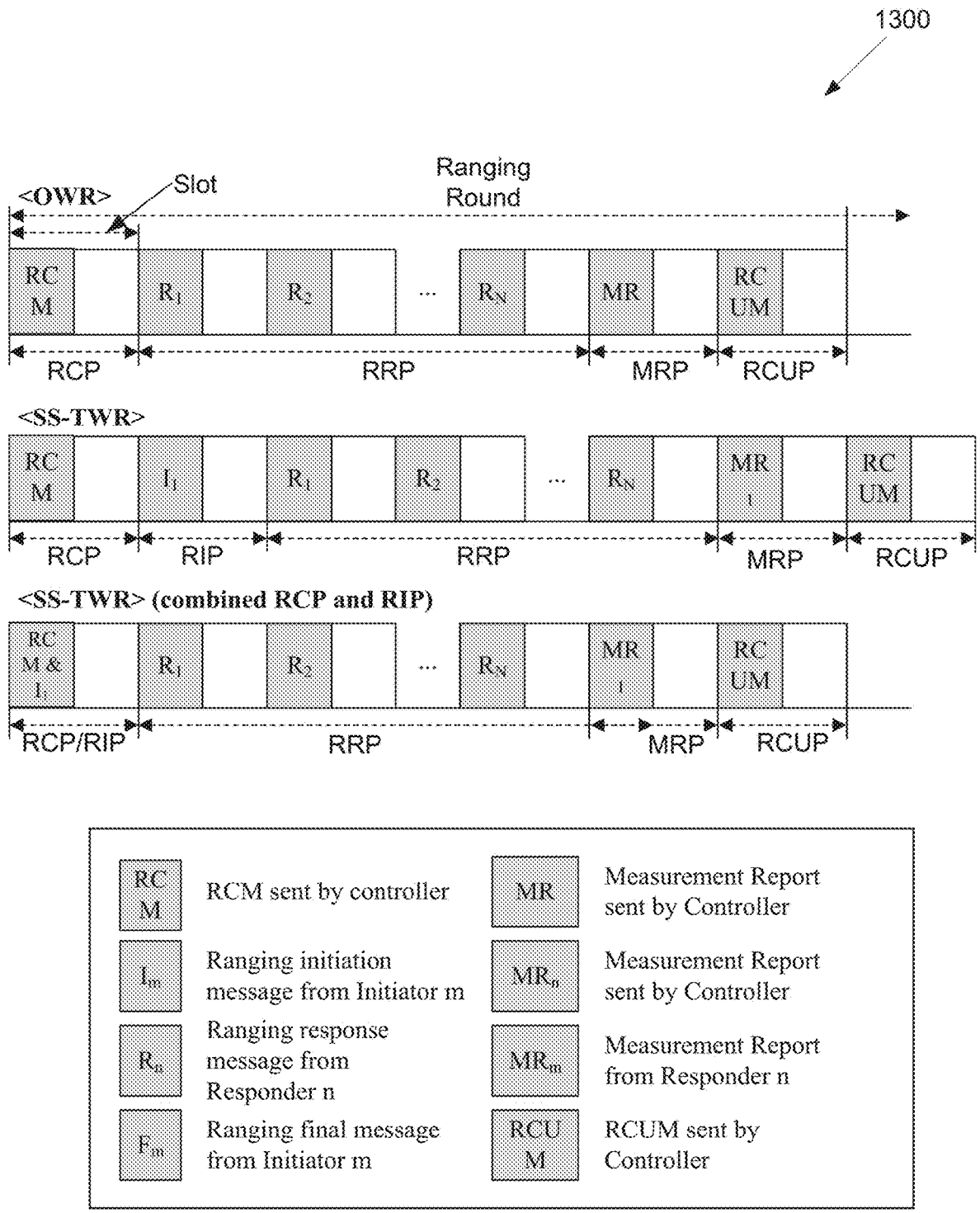
FIG. 13A illustrates an example timing diagram of ranging rounds according to embodiments of the present disclosure.

FIG. 13A illustrates an example timing diagram of ranging rounds 1300 according to embodiments of the present disclosure. The embodiment of the timing diagram of ranging rounds 1300 illustrated in FIG. 13A is for illustration only. FIG. 13A does not limit the scope of the present disclosure to any particular implementation.

Figure 13B:
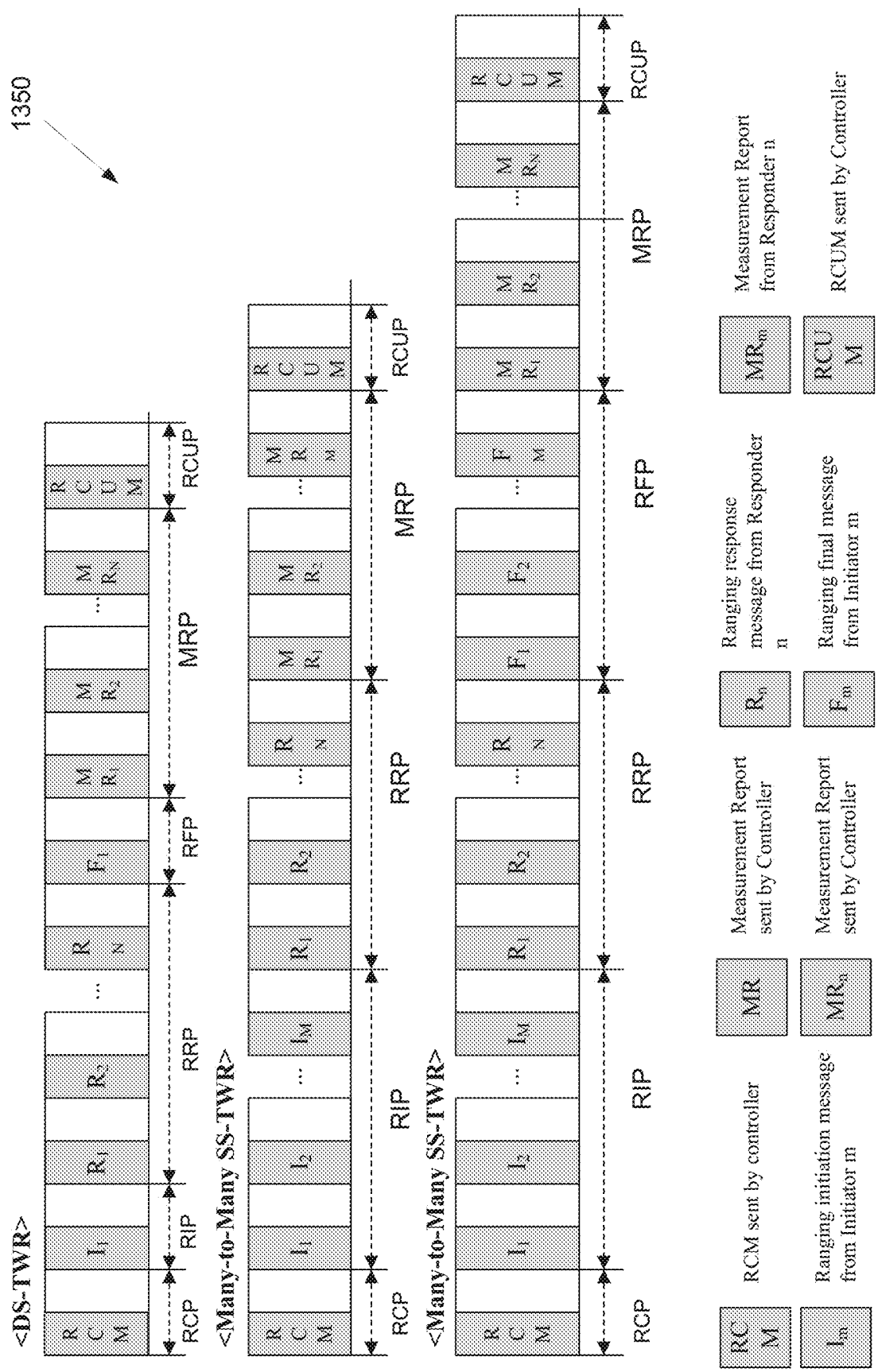
FIG. 13B illustrates an example timing diagram of ranging rounds according to embodiments of the present disclosure.

FIG. 13B illustrates an example timing diagram of ranging rounds 1350 according to embodiments of the present disclosure. The embodiment of the timing diagram of ranging rounds 1350 illustrated in FIG. 13B is for illustration only. FIG. 13B does not limit the scope of the present disclosure to any particular implementation.

Figure 14:
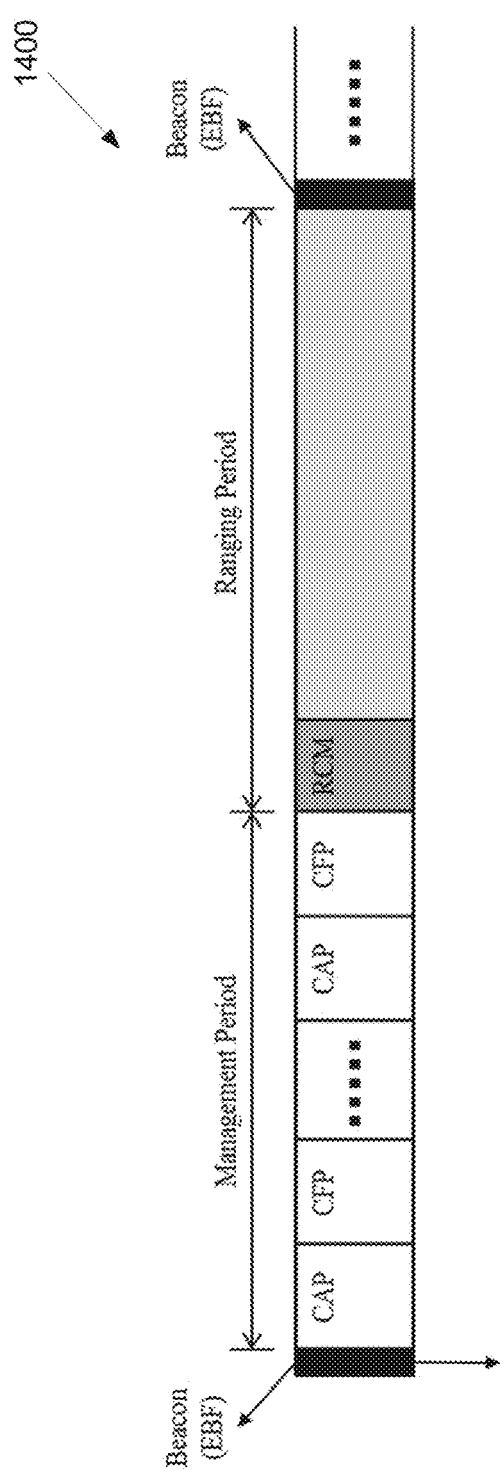
FIG. 14 illustrates an example ranging time structure according to embodiments of the present disclosure.

The ranging time structure for ranging (also termed as ranging superframe, other terms are not precluded) is shown in FIG. 14.

FIG. 14 illustrates an example ranging time structure 1400 according to embodiments of the present disclosure. The embodiment of the ranging time structure 1400 illustrated in FIG. 14 is for illustration only. FIG. 14 does not limit the scope of the present disclosure to any particular implementation.

As illustrated in FIG. 14, a ranging time structure for beacon enabled ranging with ERDEV is provided.

The ranging time structure is bounded by beacon signals. The duration between two consecutive beacons is terms as the beacon interval. The beacon interval of the ranging time structure comprises of slots or ranging slots. Each slot duration is a multiple of the ranging scheduling time unit (RSTU). The ranging time structure is divided into three parts: a beacon, the ranging management period, and the ranging period. Each period consists of one or more multiple ranging slots.

Beacon uses a frame format including but not limited to the beacon frame format, enhanced beacon frame format, etc. The beacon conveys information regarding the usage of management period. The beacon also conveys the time interval to the next beacon, also termed as beacon interval, while other terms are not precluded. In addition, the beacon conveys the timing information (example, but not limited the slot number) of the beginning of the ranging period, which is typically (but not mandatorily) characterized by the transmission of the ranging control message. This information may be conveyed in the fields of the beacon frame or as a part of any information element(s) included in the beacon frame.

The management period may have one or more contention access periods (CAP), one or more contention free periods (CFP). Each CFP and CAP comprises one or more ranging slots. The CAP and CFP may be interleaved with each other. The management period may or may not be present in a given beacon interval.

The ranging period may contain ranging blocks, ranging rounds, ranging slots, etc. as defined in 802.15.4z or other terminologies that may be followed in other standards. The ranging period begins with the ranging control message (RCM), which configures the ranging round. The ranging period may have more than one RCM. The ranging period may or may not be present in a given beacon interval.

Figure 15:
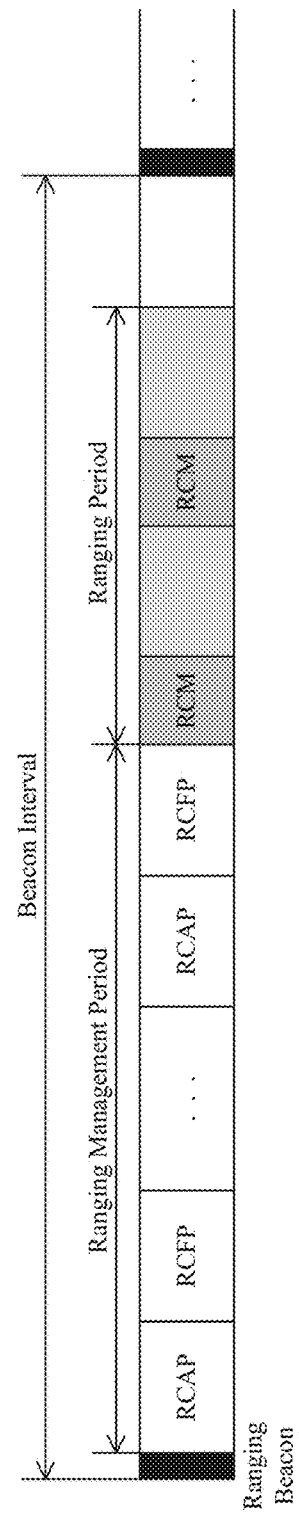
FIG. 15 illustrates another example ranging time structure according to embodiments of the present disclosure.

FIG. 15 illustrates another example ranging time structure 1500 according to embodiments of the present disclosure. The embodiment of the ranging time structure 1500 illustrated in FIG. 15 is for illustration only. FIG. 15 does not limit the scope of the present disclosure to any particular implementation.

The ranging time structure for beacon enabled ERDEV is shown in FIG. 15. The ranging time structure is characterized by repeating beacons. The time between two beacons is termed as beacon interval. The beacon interval of the ranging time structure comprises of ranging beacon slots (RBS). RBS is defined as the multiple of the ranging scheduling time unit (RSTU) specified in the ranging beacon, and spans sufficient duration for the transmission of at least one enhanced beacon frame. Beacon interval comprises three periods: the ranging beacon, the ranging management period comprises one or more RBSs, and the ranging period comprises one or more ranging slots (as defined in the 802.15.4z standard)

Ranging beacon may be transmitted using the enhanced beacon frame. The Beacon conveys the beacon interval, information on the usage of ranging management period, the beginning of the ranging period, which is typically characterized by the transmission of the ranging control message. The ranging descriptor IE (described in Scheme S9 and/or Scheme S10) is used to convey this information in the beacon.

The ranging management period may have one or more ranging contention access period(s) (RCAP) and one or more ranging contention free period(s) (RCFP). Each RCFP and RCAP comprises of one or more RBSs. The RCAP and RCFP may be interleaved with each other. The ranging management period may or may not be present in a given beacon interval. The channel access for slots in RCAP is contention based and for slots in RCFP is schedule based.

The ranging period may contain ranging blocks, ranging rounds, and/or ranging slots. The beginning of the ranging period is characterized with the ranging control message (RCM), which configures the ranging period. The ranging period may have more than one RCM. The ranging period may last until the next ranging beacon or could end before the next ranging beacon. The ranging period may or may not be present in a given beacon interval.

The ranging descriptor IE (RD IE) conveys the information of the ranging time structure. It is included in the beacon of the ranging time structure, although including this in other frames or time periods (or intervals) is not precluded. This may be formatted as a header IE or a payload IE (or both). The RD IE is formatted as shown in FIG. 16.

Figure 16:
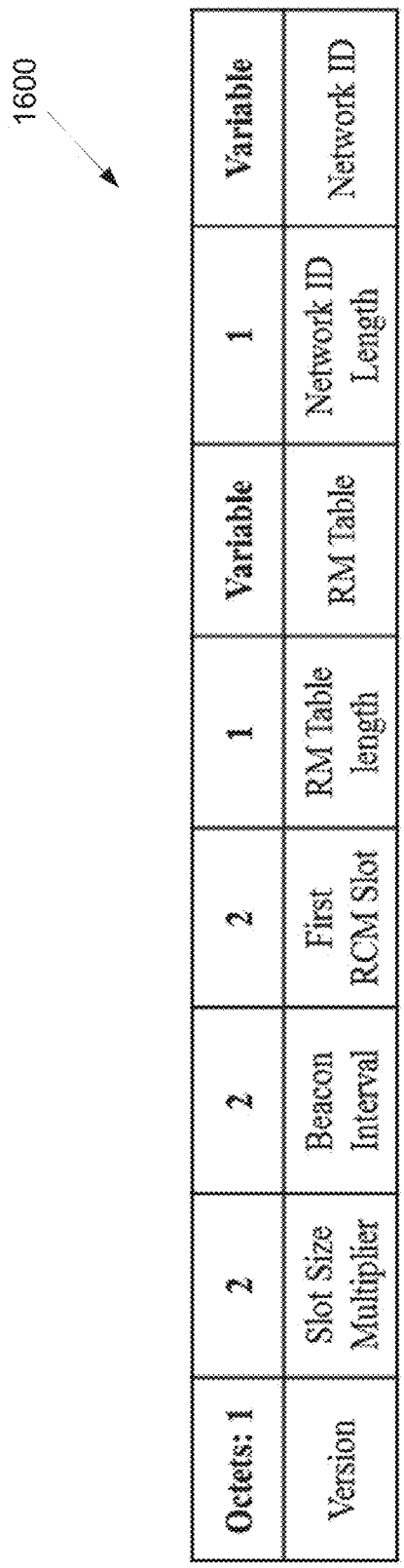
FIG. 16 illustrates an example format of the content field of ranging descriptor IE according to embodiments of the present disclosure.

FIG. 16 illustrates an example format of the content field of ranging descriptor IE 1600 according to embodiments of the present disclosure. The embodiment of the format of the content field of ranging descriptor IE 1600 illustrated in FIG. 16 is for illustration only. FIG. 16 does not limit the scope of the present disclosure to any particular implementation.

Figure 17:
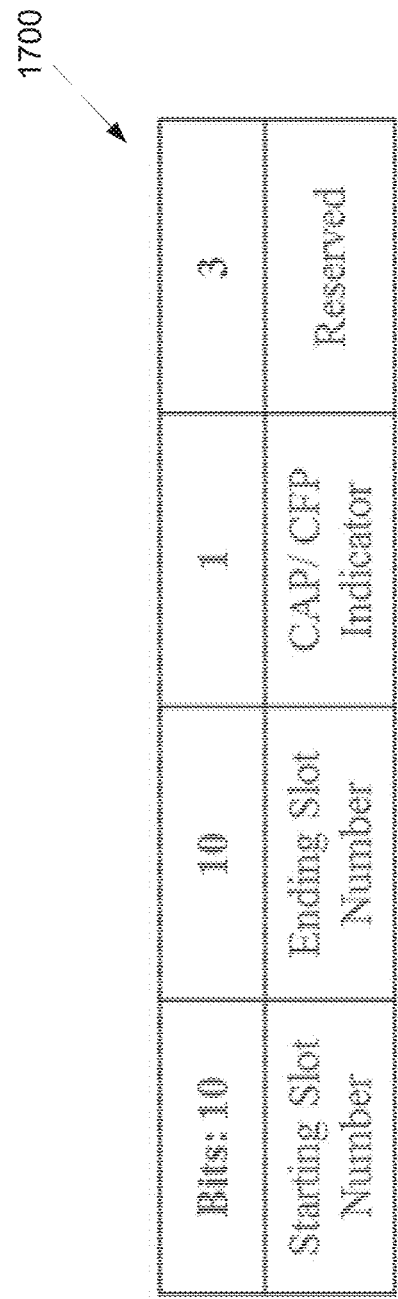
FIG. 17 illustrates an example RM Table according to embodiments of the present disclosure.

Each row of the RM table is formatted as shown in FIG. 17.

FIG. 17 illustrates an example RM table 1700 according to embodiments of the present disclosure. The embodiment of the RM table 1700 illustrated in FIG. 17 is for illustration only. FIG. 17 does not limit the scope of the present disclosure to any particular implementation.

The version field indicates the version of the standard and can be used to modify the structure of the IE and/or the ranging time structure. The present disclosure is not limited to any particular version of the standard or the IE and covers all possible versions and modifications that are used and conveyed by such an IE.

A slot size multiplier conveys the slot duration as a multiple of the ranging scheduling time unit (RSTU). A beacon interval conveys the time duration or the time interval to the next beacon.

First RCM slot field conveys the slot number of the first RCM in the beacon interval of the ranging time structure. Ranging management (RM) table length specifies the length of the ranging management table.

Each row of the RM table sequentially indicates the starting and ending slot numbers of CAP and/or CFP periods that are present in the ranging management period. The CAP/CFP indicator in each row indicates whether the set of slots specified in the row use CAP (=0) or CFP (=1) (or vice versa). The remaining three bits are reserved. Network ID Length specifies the length of the network ID. Network ID specifies the network ID number.

The ranging descriptor IE (RD IE) conveys the information of the ranging time structure. It is included in the beacon of the ranging time structure. The RD IE is formatted as shown in FIG. 18.

Figure 18:
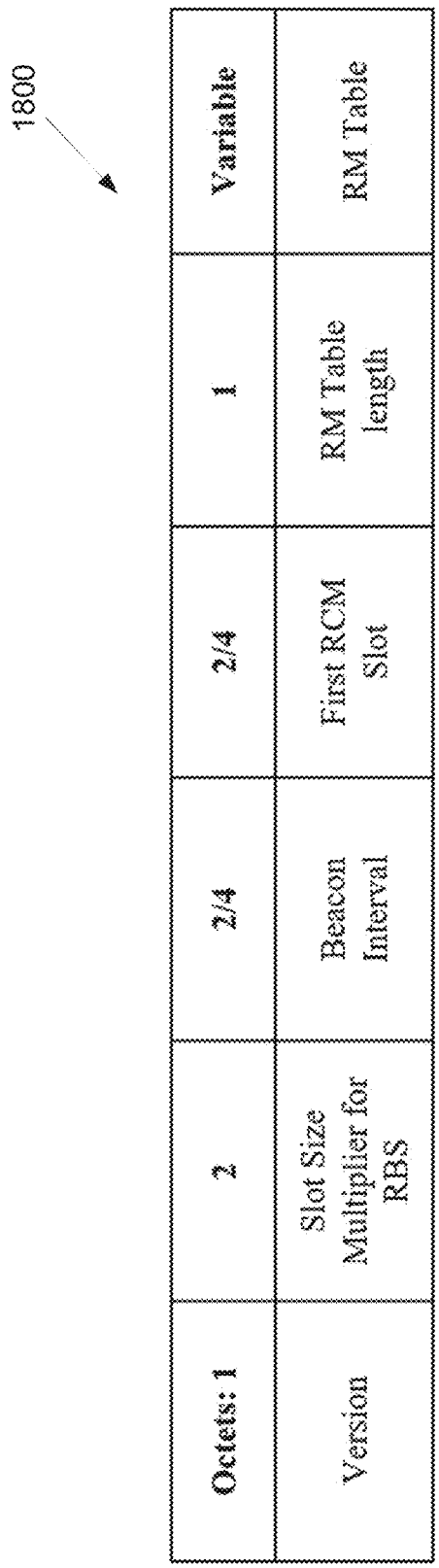
FIG. 18 illustrates an example format of the content field of ranging descriptor IE according to embodiments of the present disclosure.

FIG. 18 illustrates an example format of the content field of ranging descriptor IE 1800 according to embodiments of the present disclosure. The embodiment of the format of the content field of ranging descriptor IE 1800 illustrated in FIG. 18 is for illustration only. FIG. 18 does not limit the scope of the present disclosure to any particular implementation.

Figure 19:
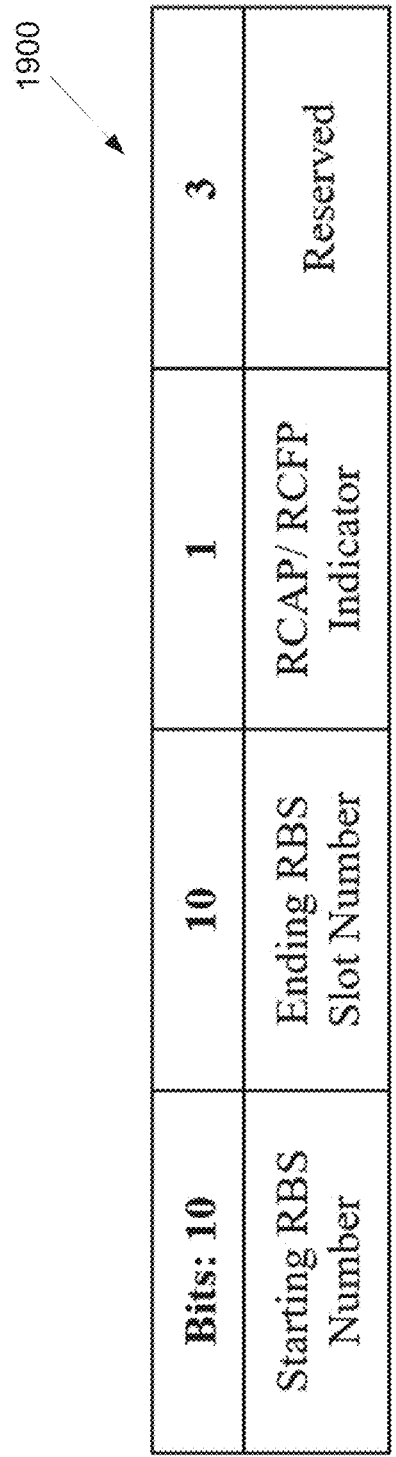
FIG. 19 illustrates an example RM table of the RD IE according to embodiments of the present disclosure.

Each row of the RM table is formatted as shown in FIG. 19.

FIG. 19 illustrates an example RM table of the RD IE 1900 according to embodiments of the present disclosure. The embodiment of the RM table of the RD IE 1900 illustrated in FIG. 19 is for illustration only. FIG. 19 does not limit the scope of the present disclosure to any particular implementation.

The version field indicates the version of the RD IE and may be set to zero for this version of the standard.

A slot size multiplier for RBS conveys the ranging slot duration as a multiple of the ranging scheduling time unit (RSTU).

A beacon interval conveys the time duration or the time interval to the next beacon in units of RSTUs.

A first RCM slot field conveys the RBS of the first RCM in the beacon interval of the ranging time structure. This may be set to zero if a ranging period is not present in the current beacon interval. The first RCM occupies the slot zero of ranging slot.

Ranging management (RM) table length specifies the length of the ranging management table. The RM table length may be set to zero if ranging management period is not present in the current beacon interval.

Each row of the RM table sequentially indicates the starting and ending slot numbers of RCAP and/or RCFP periods that are present in the ranging management period. The RCAP/RCFP indicator in each row indicates whether the set of slots specified in the row use RCAP (=0) or RCFP (=1).

The number of octets of the beacon interval field and the first RCM slot field may be the same.

The ranging descriptor IE (RD IE) conveys the information of the ranging time structure. It is included in the beacon of the ranging time structure. The RD IE is formatted as shown in FIG. 20.

FIG. 20 illustrates an example format of the content field of ranging descriptor IE 2000 according to embodiments of the present disclosure. The embodiment of the format of the content field of ranging descriptor IE 2000 illustrated in FIG. 20 is for illustration only. FIG. 20 does not limit the scope of the present disclosure to any particular implementation.

Each row of the RM Table is formatted as shown in FIG. 21.

The version field indicates the version of the RD IE and may be set to zero for this version of the standard.

A beacon interval Length field is set to "0" to indicate that the beacon interval field length is 2 octets, otherwise is set to "1" to indicate that beacon interval field length is 4 octets.

A RBS duration conveys the duration of RBS in the units of RSTUs.

A beacon interval conveys the time duration or the time interval to the next beacon in units of RSTUs.

A first RCM slot field conveys the RBS number of the first RCM following the ranging beacon in the ranging time structure. This may be set to zero if ranging period is not present before the next beacon in the ranging time structure. The first RCM occupies the slot number zero of the first ranging round of the ranging period.

Ranging management (RM) table length specifies the length of the ranging management table. The RM table length may be set to zero if ranging management period is not present in the current beacon interval.

Each row of the RM table sequentially indicates the starting and ending slot numbers of RCAP and/or RCFP periods that are present in the ranging management period. The RCAP/RCFP indicator in each row indicates whether the set of slots specified in the row use RCAP (=0) or RCFP (=1).

FIG. 21 illustrates an example RM table of the RD IE 2100 according to embodiments of the present disclosure. The embodiment of the RM table of the RD IE 2100 illustrated in FIG. 21 is for illustration only. FIG. 21 does not limit the scope of the present disclosure to any particular implementation.

The number of octets of the beacon interval field and the first RCM slot field may be the same.

Figure 22:
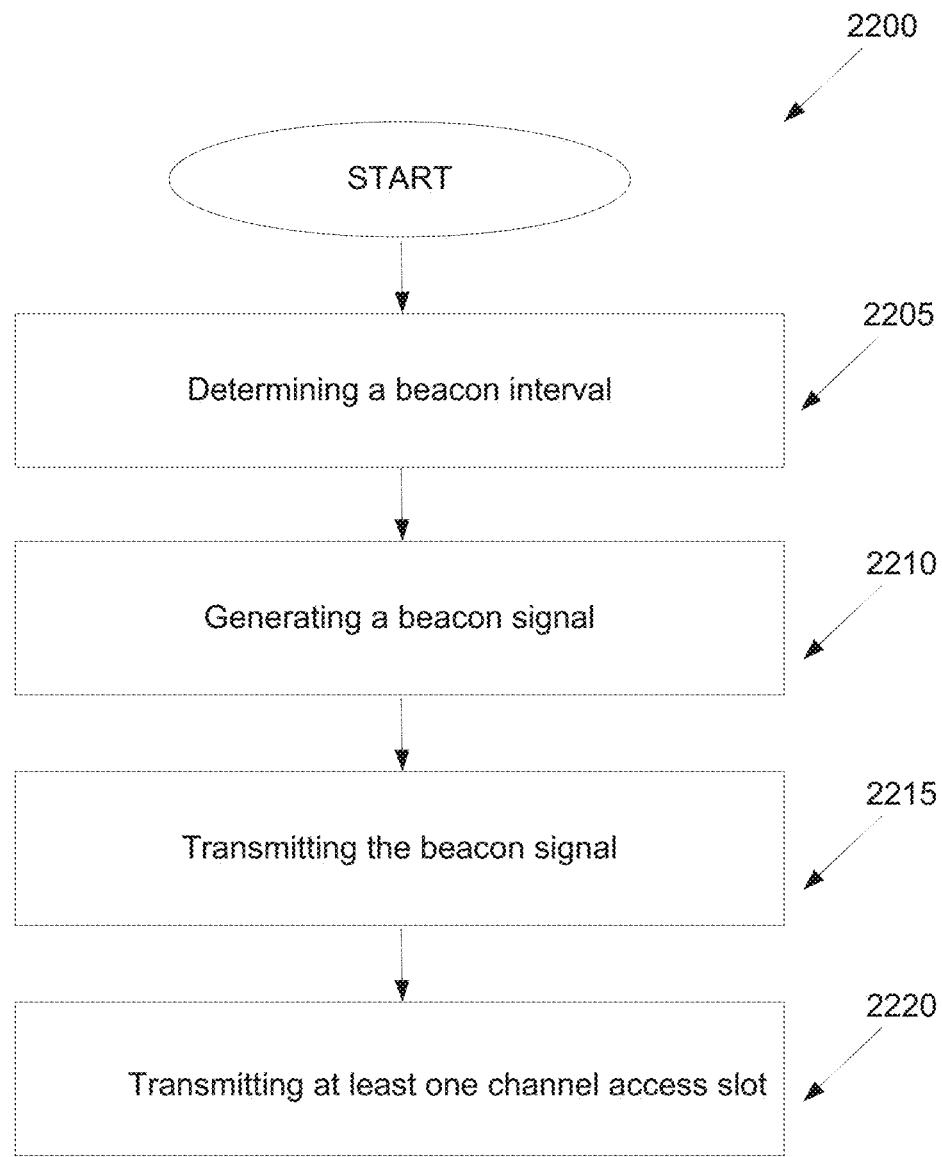
FIG. 22 illustrates a flowchart of a method for a flexible operation according to embodiments of the present disclosure.

FIG. 22 illustrates a flowchart of a method 2200 for a flexible operation according to embodiments of the present disclosure, as may be performed by a transmit apparatus. The embodiment of the method 2200 illustrated in FIG. 22 is for illustration only. FIG. 22 does not limit the scope of the present disclosure to any particular implementation.

As illustrated in FIG. 22, the method 2200 begins at step 2205.

In step 2205, a transmit apparatus of the communication node with ranging capability determines a beacon interval including a ranging management period and a ranging period, wherein the beacon interval is a variable interval.

In one embodiment, the ranging period is determined based on a number of RCM inserted in the ranging period.

Subsequently, in step 2210, the transmit apparatus of the communication node with ranging capability generates a beacon signal including information for a number of channel access slots corresponding to a ranging contention access period (RCAP) and a ranging contention free period (RCFP).

In one embodiment, the transmit apparatus of the communication node with ranging capability generates the beacon signal including information for the beacon interval between two consecutive beacon signals.

In one embodiment, the transmit apparatus of the communication node with ranging capability generates the beacon signal including information for a starting time of the ranging period.

In such embodiments, beacon signal comprises a ranging descriptor information element (RD IE) for a ranging time structure including: a version field indicating a version of the RD IE; a beacon interval length indicating a duration of the beacon signal; a ranging beacon slot (RBS) duration for RBS field indicating a ranging slot duration as a multiple of a ranging scheduling time unit (RSTU); a beacon interval field indicating a time duration of a time interval to a next beacon signal in units of RSTUs; a first RCM slot field indicating a time instance of an RBS of a first RCM in the beacon interval of the ranging time structure; a ranging management (RM) table length field indicating a length of the RM table field; and a RM table field.

In such embodiments, the RM table field comprises: a starting RBS slot number field indicating a starting slot number for a first RBS; an ending RBS slot number field indicating an ending slot number for a last RBS; an RCAP/RCFP indicator field indicating whether the at least one channel access slot uses the RCAP or the RCFP; and a reserved field.

In one embodiment, the RCAP and the RCFP comprise at least one RBS, respectively, and wherein the RCAP and the RCFP are interleaved each other.

Next, in step 2215, the transmit apparatus of the communication node with ranging capability (e.g., RDEV, ERDEV, or SRDEV) transmits, to a receive apparatus of the communication node with ranging capability (e.g., RDEV, ERDEV, or SRDEV), the beacon signal at the determined beacon interval.

Finally, in step 2220, the transmit apparatus of the communication node with ranging capability transmits, to the receive apparatus of the communication node with ranging capability, at least one channel access slot in the ranging management period.

In one embodiment, the transmit apparatus of the communication node with ranging capability transmits at least one ranging control message (RCM) in the ranging period.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A transmit apparatus in a wireless communication system supporting ranging capability, the transmit apparatus comprising:
  a processor configured to:
    determine a beacon interval including a ranging management period and a ranging period; and
    generate a beacon frame including information for a number of slots configuring a ranging contention access period (RCAP) and a ranging contention free period (RCFP) that are included in the ranging management period; and a transceiver operably connected to the processor, the transceiver configured to transmit, to a receive apparatus, the beacon frame at the determined beacon interval.

2. The transmit apparatus of claim 1, wherein the processor is further configured to generate the beacon frame including information for the beacon interval between two consecutive beacon frames.

3. The transmit apparatus of claim 1, wherein:
the processor is further configured to generate the beacon frame including information for a starting time of the ranging period; and
the transceiver is further configured to transmit at least one ranging control message (RCM) in the ranging period.

4. The transmit apparatus of claim 1, wherein the beacon frame comprises a ranging descriptor information element (RD IE) for a ranging time structure including:
a beacon interval length indicating a length of a beacon interval field included in the beacon frame;
a ranging beacon slot (RBS) duration for RBS field indicating a ranging slot duration as a multiple of a ranging scheduling time unit (RSTU);
a beacon interval field indicating a time interval to a next beacon frame in units of RSTUs;
a first RCM slot field indicating a slot index of a first RCM in the beacon interval of the ranging time structure;
a ranging management (RM) table length field indicating a length of an RM table field; and
the RM table field includes information for the ranging management period.

5. The transmit apparatus of claim 4, wherein the RM table field comprises:
a start field indicating a starting slot number of the RCAP or the RCFP;
an end field indicating an ending slot number of the RCAP or the RCFP; and
an RCAP/RCFP indicator field indicating whether slots specified in a row of the RM table field are included in the RCAP or the RCFP.

6. The transmit apparatus of claim 1, wherein the RCAP and the RCFP comprise at least one ranging beacon slot (RBS), respectively, and wherein the RCAP and the RCFP are interleaved together.

7. The transmit apparatus of claim 1, wherein the ranging period includes one or more ranging control messages (RCMs), and the one or more RCMs configure the ranging period.

8. A receive apparatus in a wireless communication system supporting ranging capability, the receive apparatus comprising:
a transceiver configured to receive, from a transmit apparatus, a beacon frame at a beacon interval; and
a processor operably connected to the transceiver, the processor configured to determine the beacon interval including a ranging management period and a ranging period,
wherein the beacon frame includes information for a number of slots configuring a ranging contention access period (RCAP) and a ranging contention free period (RCFP) that are included in the ranging management period.

9. The receive apparatus of claim 8, wherein the processor is further configured to identify the beacon frame including information for the beacon interval between two consecutive beacon frames.

10. The receive apparatus of claim 8, wherein:
the processor is further configured to identify the beacon frame including information for a starting time of the ranging period; and
the transceiver is further configured to receive at least one ranging control message (RCM) in the ranging period.

11. The receive apparatus of claim 8, wherein the beacon frame comprises a ranging descriptor information element (RD IE) for a ranging time structure including:
a beacon interval length indicating a length of a beacon interval field included in the beacon frame;
a ranging beacon slot (RBS) duration for RBS field indicating a ranging slot duration as a multiple of a ranging scheduling time unit (RSTU);
a beacon interval field indicating a time duration of a time interval to a next beacon frame in units of RSTUs;
a first RCM slot field indicating a slot index of a first RCM in the beacon interval of the ranging time structure;
a ranging management (RM) table length field indicating a length of an RM table field; and
the RM table field includes information for the ranging management period.

12. The receive apparatus of claim 11, wherein the RM table field comprises:
a start field indicating a starting slot number of the RCAP or the RCFP;
an end field indicating an ending slot number of the RCAP or the RCFP; and
an RCAP/RCFP indicator field indicating whether slots specified in a row of the RM table field are included in the RCAP or the RCFP.

13. The receive apparatus of claim 8, wherein the RCAP and the RCFP comprise at least one ranging beacon slot (RBS), respectively, and wherein the RCAP and the RCFP are interleaved together.

14. The receive apparatus of claim 8, wherein the ranging period includes one or more ranging control messages (RCMs), and the one or more RCMs configured the ranging period.

15. A method of transmit apparatus in a wireless communication system supporting ranging capability, the method comprising:
determining a beacon interval including a ranging management period and a ranging period;
generating a beacon frame including information for a number of slots configuring a ranging contention access period (RCAP) and a ranging contention free period (RCFP) that are included in the ranging management period; and
transmitting, to a receive apparatus, the beacon frame at the determined beacon interval.

16. The method of claim 15, further comprising generating the beacon frame signal including information for the beacon interval between two consecutive beacon frames.

17. The method of claim 15, further comprising:
generating the beacon frame including information for a starting time of the ranging period; and
transmitting at least one ranging control message (RCM) in the ranging period.

18. The method of claim 15, wherein the beacon frame comprises a ranging descriptor information element (RD IE) for a ranging time structure including:

a beacon interval length indicating a length of a beacon interval field included in of the beacon frame;

a ranging beacon slot (RBS) duration for RBS field indicating a ranging slot duration as a multiple of a ranging scheduling time unit (RSTU);

a beacon interval field indicating a time interval to a next beacon frame in units of RSTUs;

a first RCM slot field indicating a slot index of a first RCM in the beacon interval of the ranging time structure;

a ranging management (RM) table length field indicating a length of an RM table field; and the RM table field includes information for the ranging management period.

19. The method of claim 18, wherein the RM table field comprises:

a start field indicating a starting slot number of the RCAP or the RCFP;

an end field indicating an ending slot number of the RCAP or the RCFP; and an RCAP/RCFP indicator field indicating whether slots specified in a row of the RM table field are included in the RCAP or the RCFP.

20. The method of claim 18, wherein the RCAP and the RCFP comprise at least one ranging beacon slot (RBS), respectively, wherein the RCAP and the RCFP are interleaved together, and wherein the ranging period includes one or more ranging control messages (RCMs), and the one or more RCMs configure the ranging period.

* * * * *